May 18, 1937.   B. E. COX   2,080,763
GARDEN IMPLEMENT
Filed Sept. 27, 1935
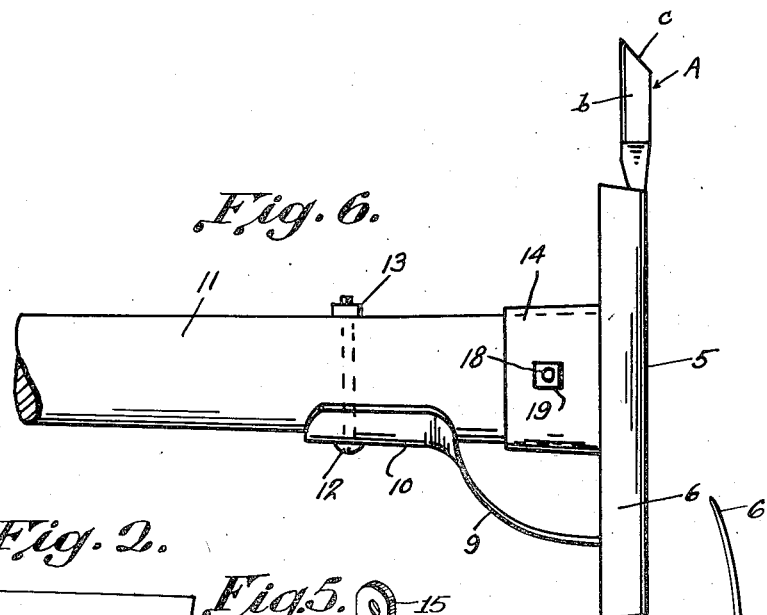
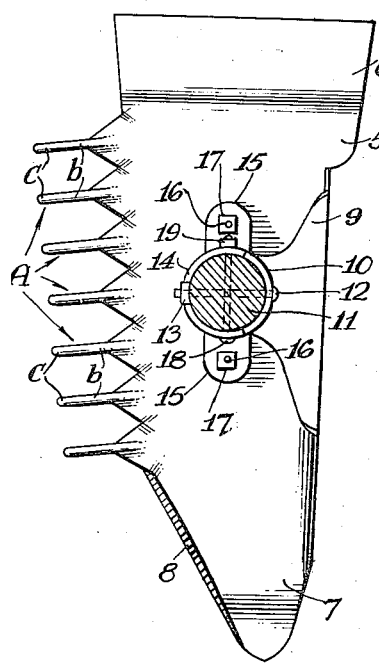
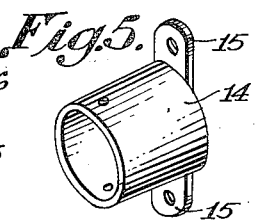
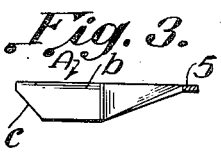
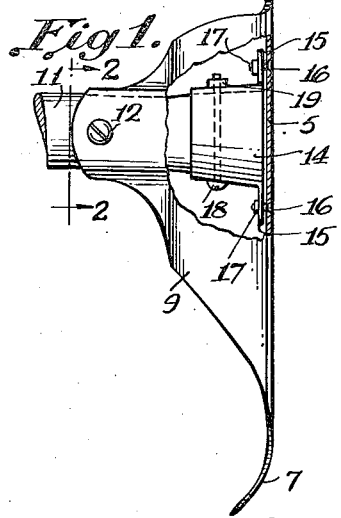
Inventor
B. E. Cox
By Clarence A. O'Brien
Attorney Patented May 18, 1937

2,080,763

UNITED STATES PATENT OFFICE 2,080,763

GARDEN IMPLEMENT

Burton E. Cox, Santa Cruz, Calif.

Application September 27, 1935, Serial No. 42,524

1 Claim. (Cl. 97—66)

This invention appertains to new and useful improvements in garden implements of the hand type.

The principal object of the present invention is to provide a garden implement which can be employed for a variety of uses, such as hoeing, raking, light plowing and the crushing of clods of earth.

Another important object of the invention is to provide a garden implement which is substantially constructed of a single sheet of metal.

During the course of the following specification other important objects and advantages of the invention will become apparent to the reader.

In the drawing:

Figure 1 represents a side elevational view of the implement with a part broken away to disclose the connection between the handle and the tool head.

Figure 2 is a sectional view taken substantially on the line 2—2 of Figure 1.

Figure 3 is a fragmentary transverse sectional view showing one of the rake teeth.

Figure 4 represents a fragmentary front elevational view of the implement showing one of the teeth.

Figure 5 is a perspective view of the handle socket.

Figure 6 is a fragmentary top plan view of the implement.

Referring to the drawing wherein like numerals designate like parts, it can be seen that numeral 5 represents the plate from which the parts of the implement are constructed. The upper end portion of the plate 5 is flared and curved slightly backward to provide a hoe 6, while the lower portion of the plate 5 tapers downwardly and is slightly curved backwardly to provide a plow portion 7, which incidentally serves as a mould board.

One longitudinal edge portion of the plate 5 is provided with a backwardly extending fin 9. This fin is reduced gradually in its rear direction and at its free end is curved as at 10 to fit snugly against the implement handle 11. A bolt 12 is disposed through the portion 10 of the fin 9 and through the handle 11 and equipped with a nut 13 as shown in Figure 2.

Numeral 14 represents the handle socket which is of tapering construction and is provided with a pair of lugs 15—15 apertured to receive the bolts 16—16, the heads of which are countersunk in the forward side of the plate 5. These bolts are provided with nuts 17 and as it will be seen in Figure 1, a bolt 18 provided with a nut 19 passes through the socket 14 and the forward end of the handle 11 in such a manner as to permit the forward end of the handle 11 to project a slight distance beyond the lugs 15 so as to bear snugly against the plate 5 when the nuts 17 are tightened to their fullest extent on the bolt 16.

It will be observed in Figures 2 and 4 particularly, that the opposite longitudinal edge of the plate 5 from the edge having the clod crushing fin 9 is provided with teeth A and these teeth are constructed by simply slitting the plate 5 inwardly at longitudinally spaced intervals to provide extensions which are bent together as denoted by b—b in Figure 4 to provide reinforced teeth, these teeth which will be denoted by reference character A—A are beveled off at their free ends as at c. Thus the teeth are provided for disposition laterally of the plate 5 all in parallel relation with respect to each other. These teeth in the arrangement shown in Figure 2 serve to form a rake.

While the foregoing specification sets forth the invention in specific terms, it is to be understood that numerous changes in the shape, size and materials may be resorted to without departing from the spirit or scope of the invention as claimed hereinafter.

Having thus described the invention, what I claim as new is:

A garden implement of the character described comprising a head structure consisting of an elongated plate provided with ground-engaging formations at its opposite ends, a socket structure at the intermediate portion of one side of the plate, one longitudinal edge portion of the plate being provided with a backwardly disposed tongue, a handle, one end of the handle disposed into the socket, the free end of the said tongue being secured to the handle, said handle being flared at the plate end thereof, said socket being of tapered construction for receiving the flared portion of the handle, and tightening means between the socket and the plate.

BURTON E. COX.